United States Patent [19]

Webb

[11] 4,089,399
[45] May 16, 1978

[54] MECHANICAL HANDLING APPARATUS

[75] Inventor: John Edmund Richard Webb, Bodorgan, Wales

[73] Assignee: Hydraroll Limited, Birmingham, United Kingdom

[21] Appl. No.: 735,573

[22] Filed: Oct. 26, 1976

[30] Foreign Application Priority Data

Jul. 6, 1976 United Kingdom ............... 28124/76

[51] Int. Cl.² .............................................. B60P 1/52
[52] U.S. Cl. ................... 193/35 SS; 214/84; 214/512
[58] Field of Search ............... 214/84, 512; 193/35 SS

[56] References Cited

U.S. PATENT DOCUMENTS

| 2,828,027 | 3/1958 | Stevenson et al. | 214/84 X |
| 3,011,665 | 12/1961 | Wise | 193/35 SS X |
| 3,262,588 | 7/1966 | Davidson | 214/84 |
| 3,437,219 | 4/1969 | Stevenson | 214/84 |

FOREIGN PATENT DOCUMENTS 1,002,355 8/1965 United Kingdom ............. 193/35 SS Primary Examiner—Albert J. Makay
Attorney, Agent, or Firm—Blanchard, Flynn, Thiel, Boutell & Tanis

[57] ABSTRACT

The invention relates to a device which is for use as or as part of mechanical handling apparatus. It includes an elongate body, and, in the embodiment described, a support for supporting the load and an internal member housing rollers and which is movable above and below the support by an inflatable device in the form of an air bag. The body member is elongate so that it forms a kind of track and it includes a stop in the form of a plate which can be moved between a position in which a load can be moved along the track and a position where it prevents or hinders movement along the track. The track can thus be kept "live" during all loading and unloading operations and the stop keeps loads in their desired positions on the track both during handling and transport.

7 Claims, 5 Drawing Figures

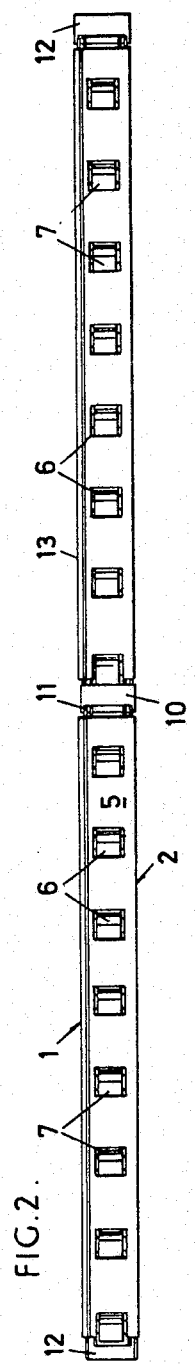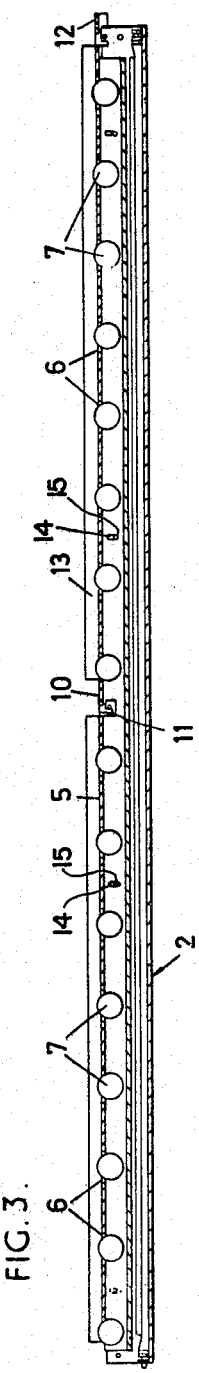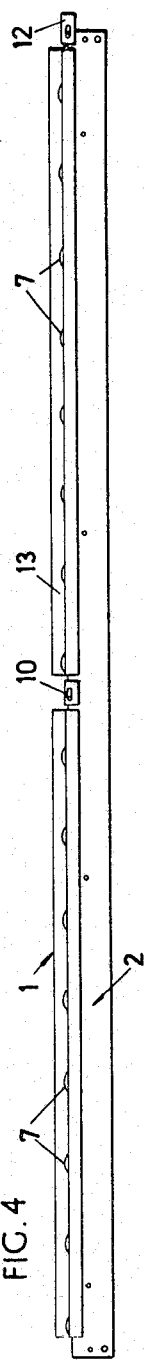

MECHANICAL HANDLING APPARATUS

BACKGROUND OF THE INVENTION

The invention relates to a device for use as or as part of material handling apparatus and to such apparatus and particularly concerns such device and apparatus for facilitating moving and securing loads which may be carried for example on pallets for example in a load carrying vehicle.

According to one aspect of the invention there is provided a device for use as or as part of mechanical handling apparatus which can support a load both during movement of the load into position and when the load is static, the device comprising an elongate body member, a support (as herein defined) for loads, an inflatable device connected to the support for raising and lowering it, and stop means of the device which is movable between one position in which passage along the device is unimpeded and another position in which passage along the device is prevented or hindered.

The support for loads may comprise it will be understood, and is defined herein to mean, either (a) a support surface for carrying loads which is movable by the inflatable device up and down in relation to the upper boundary surface of rotatable members such as rollers which are mounted in a static mounting of the device, or (b) rotatable members such as rollers which themselves are held in a mounting which is reciprocable by the inflatable device so that the rollers or part thereof move transversely of the plane of a static support surface on which loads are seated when the inflatable device is deflated.

The stop means may be positioned intermediate the length of the body member so that the device is, in the another position of the stop means, formed into sections for supporting a load.

There may be stop means at one or both ends of the device.

The stop means may comprise a plate which rests on the body member in the one position and which in said another position rests in a slot or slots in the body member so that the plate presents an obstruction above the level of the body member and the rollers.

The support may comprise a load bearing plate which has a plurality of discrete openings, there being as many openings as there are rollers and the arrangement of the rollers and the openings being such that each roller is associated with a respective one of the openings.

The clearance of the roller and the boundary of the associated opening is preferably such that the load bearing plate prevents ingress of dirt into the body member.

The body member may include a guide plate which is secured to one of its sides and which extends in the longitudinal direction of the device at a position above the load bearing surface of the load bearing plate.

According to a second aspect, the invention provides a pair of devices as hereinbefore defined comprising mechanical handling apparatus for pallets, the devices being of such a distance apart that each one supports the legs or other supports such as skids along one side of a pallet.

According to a third aspect, there is provided mechanical handling apparatus comprising a device or devices are hereinbefore defined mounted in a vehicle.

BRIEF DESCRIPTION OF THE DRAWINGS

One construction embodying the invention is diagrammatically illustrated, by way of example, in the accompanying drawings, in which:

FIG. 2 shows a plan view of the device;

FIG. 3 shows a longitudinal sectional view of the device;

FIG. 4 shows a side elevational view of the device.

DETAILED DESCRIPTION

Figure 1:
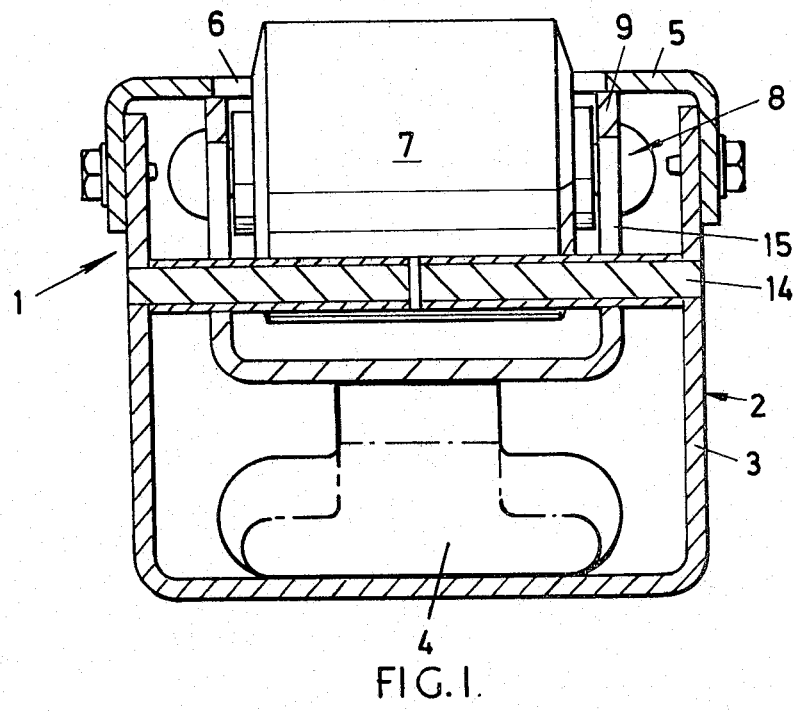
FIG. 1 shows a vertical sectional view of a device for use in mechanical handling apparatus.

Referring to the drawings, the device 1 shown has a hollow elongate body member 2 in the form of a channel member 3 which houses an inflatable device in the form of an air bag assembly 4 which has connectors (not shown) for connecting it to an existing air supply of a vehicle for example.

The open top of the channel member 3 is closed by a static support surface in the form of a top plate 5 (as viewed in FIG. 1) which has a number of discrete openings 6. A roller 7 is aligned, in the vertical sense, with each opening 6. The rollers 7 are freely rotatable and are mounted by means 8 such as a shaft and retainer nuts in a mounting in the form of a channel shaped support 9 which is situated internally of the device and the underside of which is connected to the air bag assembly 4.

The clearance of the rollers 7 and their associated openings 6 is such that substantially no foreign bodies can enter the channel member. Under the support 9 and above the air bag 4 there is a flat plate (not shown) covering the width of the inside of the track to protect the air bag from foreign bodies which might possibly enter into the inside section.

The device 1 has stop means in the form of a plate 10 intermediate its length. The stop plate 10 comprises a flat plate which can be moved manually from one position (a horizontal position) to another position (an upright position) in which it is supported in a slot 11 in the body member 2. There is a slot 11 at either side of the device, see FIG. 2.

There is a stop plate 12 at each end of the device.

The stop plate 10 is between two rollers 7 so that in the inoperative horizontal position shown in FIG. 2, one edge lies close to one of the rollers.

Figure 3A:
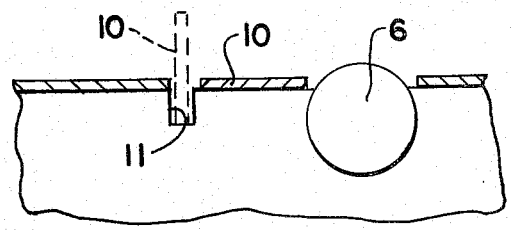
FIG. 3A is an enlargement of a part of FIG. 3.

There is a longitudinally extending guide plate 13 (FIGS. 2 to 4) secured to one side of the device 1 (though this guide plate can, it will be understood, be dispensed with).

Operation

In operation, for handling loads or pallets in for example a forty-foot vehicle, one or more pairs of devices 1 are laid along the length of the vehicle at lateral spacings adequate to support the feet of pallets. The devices 1 form tracks. The air bag assemblies 4 are connected up to the air supply of the vehicle, which is operated by a simple two way position valve for "on/off" operation.

There may be several devices 1 said end to end in each track of a pair, depending on the length of the vehicle.

In order to handle and secure pallets, the or each air bag assembly 4 is inflated (from the chain dotted to full line position in FIG. 1) so that the support 9 and thus the rollers 7 are raised so that part of the boundary surface of the rollers protrudes above the plane of the top plate 5. The rounded heads of the nuts of the means 8 prevents canting of the support 9 during raising and lowering, and guiding is effected by a guide pin 14 which is fixed to and extends between the side legs of the channel 3, which guide pin extends through the vertically elongated guide slots 15 formed in the opposite side legs of the support 9. Then, with the stop plates 10, 12 in a horizontal inoperative position as shown, wherein they are substantially flush with the top plate 5, the pallets are pushed over the tracks. When a pallet is in position, the stop plates 10 are swingably moved manually to the upright position shown by dotted lines in FIG. 3A so that they are supported in the slots 11 and project upwardly above the rollers to prevent or hinder movement of the pallet along the track. This is particularly important where handling is taking place on uneven ground, which could otherwise cause movement of a pallet if the stop plates were not used. The operator, or other personnel, can then position other pallets in the vehicle until all are in position. In this way, the apparatus forming the track stays "live" during the whole loading operation. When all the pallets are loaded, the or each air bag assembly 4 can be deflated so that the rollers 7 retract below the plane of the top plate 5 and the track becomes "dead" with the legs of the pallets supported by the top plates 5.

The apparatus can be built into a floor of a vehicle, or can be laid on an existing floor.

The apparatus can take loads of up to 2 tons per pallet at a P.S.I. of 40 lbs. The equipment is normally operated at 20 P.S.I.

When in use, the guide plate 13 helps guidance of the pallets during movement to and from the stowed position It will be appreciated that the invention may take other forms than that shown in the drawings and above described. Thus it is possible to omit a top plate 5 providing that a support for loads is maintained, the guide 14, and the flat plate between the support 9 and the air bag 4. The rollers 7 may also be of any suitable configuration and indeed could be replaced by spherical bearings or conveyors in certain circumstances. Also, each length of track-like device could have more than the single stop means intermediate its length for example there could be two or three between the ends, though this member is not to be taken as limiting. When two tracks are laid end-to-end, the adjacent ends may be made complementary to give a smooth run along the track.

The inflatable device may also be inflatable by ingress of liquid.

I claim:

1. A device for use as or as part of mechanical handling apparatus which can support a load both during movement of the load into position and when the load is static, the device comprising an elongate body member, a support for loads movably supported on said body member, an inflatable device associated with the body member and connected to the support whereby said support can be raised and lowered between a position in which a load can be moved over the device and a position in which a load is supported in a desired position along the device, and stop means movably supported on said body member and comprising a substantially flat stop plate which is movable relative to said body member between a first position wherein the plate is disposed substantially horizontally and a second position wherein the plate is disposed substantially vertically, said plate laying substantially parallel to the direction of load movement and forming part of the support when in the first position whereby passage of said load along the device is possible, and said plate when in said second position being supported in an upright position on said body member and projecting upwardly above the uppermost load engaging point on the support when it is in its raised position for preventing passage of said load along the device.

2. The device of claim 1, wherein said plate is positioned intermediate the length of said device.

3. The device of claim 2, wherein said stop means includes a further stop plate positioned at an end of said device.

4. The device of claim 2, wherein said said stop means includes a stop plate positioned at both ends of said device.

5. The device of claim 1, wherein said body member and said support have guide means for guiding said support during movement between said positions of said support during inflation and deflation of said inflatable device.

6. The device of claim 5, wherein said body member is of channel section and said support is movable and comprises a second channel section the flanges of which are parallel to the flanges of said body member channel section and are vertical, and wherein said guide means comprises aligned slots in the flanges of said second channel section and a pin secured between the flanges of the body member and which is received in the aligned slots.

7. A device for use as or as part of mechanical handling apparatus which can support a load both during movement of the load into position and when the load is static, the device comprising an elongate body member which is of channel section and has sidewalls each having a lateral slot directed toward the web of said channel section, a support for loads movably supported on said body member, an inflatable device associated with the body member and connected to the support whereby said support can be raised and lowered between a position in which a load can be moved over the device and a position in which a load is supported in a desired position along the device, and stop means comprising a manually movable plate which is movable between a first position wherein the plate lies parallel to the web of the channel section and a section position wherein the plate is supported in said slots and projects upwardly, said plate forming part of the support when in the first position whereby passage of said load along the device is possible, and said plate when in said second position preventing passage of said load along said device.

UNITED STATES PATENT AND TRADEMARK OFFICE
CERTIFICATE OF CORRECTION

PATENT NO. : 4 089 399
DATED : May 16, 1978
INVENTOR(S) : John Edmund Richard Webb It is certified that error appears in the above-identified patent and that said Letters Patent are hereby corrected as shown below:

Column 4, line 22; delete "said" (first occurrence).

line 23; before "stop" insert ---said---.

line 54; change "section" (second occurrence) to

---second---.

Signed and Sealed this

*Twenty-fourth* Day of *October 1978*

[SEAL]

*Attest:*

RUTH C. MASON
*Attesting Officer*

DONALD W. BANNER
*Commissioner of Patents and Trademarks*